(12) United States Patent
Lybbert (10) Patent No.: US 7,656,134 B2
(45) Date of Patent: Feb. 2, 2010

(54) B-PLUS PATCH AND VOLTAGE TRANSIENT SPIKE SUPPRESSOR FOR AN AUTOMOTIVE VOLTAGE REGULATOR

(76) Inventor: Justin B. Lybbert, 11799 Holbrook Close, Fishers, IN (US) 46037

( * ) Notice: Subject to any disclaimer, the term of this patent is extended or adjusted under 35 U.S.C. 154(b) by 133 days.

(21) Appl. No.: 11/823,972

(22) Filed: Jun. 28, 2007

(65) Prior Publication Data
US 2008/0054856 A1 Mar. 6, 2008

Related U.S. Application Data

(60) Provisional application No. 60/817,270, filed on Jun. 29, 2006.

(51) Int. Cl.
*H02P 11/00* (2006.01)
*H02P 9/00* (2006.01)
(52) U.S. Cl. .................... 322/28; 322/24; 310/68 D
(58) Field of Classification Search ............. 322/24, 322/28, 46, 44, 59; 310/68 D; 361/18, 42, 361/31
See application file for complete search history.

(56) References Cited
U.S. PATENT DOCUMENTS

| | | | | |
|---|---|---|---|---|
| 3,571,657 A | * | 3/1971 | Domann | 361/21 |
| 3,836,821 A | * | 9/1974 | Wahlgren et al. | 361/45 |
| 4,459,489 A | | 7/1984 | Kirk et al. | |
| 4,470,003 A | | 9/1984 | Mitchell | |
| 4,636,706 A | | 1/1987 | Bowman et al. | |
| 4,733,159 A | | 3/1988 | Edwards et al. | |
| 5,043,650 A | * | 8/1991 | Bhagwat et al. | 320/150 |
| 6,646,845 B1 | * | 11/2003 | Turner et al. | 361/86 |
| 7,064,525 B2 | | 6/2006 | Pachciarz et al. | |
| 2002/0031000 A1 | * | 3/2002 | Sakai et al. | 363/65 |
| 2008/0265845 A1 | * | 10/2008 | Lybbert | 322/28 |

* cited by examiner

*Primary Examiner*—Julio C Gonzalez
(74) *Attorney, Agent, or Firm*—John D. Ritchison (57) ABSTRACT

An Improved Automotive All Silicon Voltage Regulator (I-ASVR) for use in the automotive components re-manufacturing and original equipment alternator product. Particularly this device improves the electrical connections, prevents failures related to poor connections and heat variations, and eliminates failures from transient voltage surges that effect electronic devices. The device may be replacement regulator for re-manufacturing or an original equipment regulator to improve quality and durability. It is comprised essentially of four significant changes to a standard voltage regulator: an addition to the electronics of a transient suppression for the loads; a connection for the battery connection (B+) through a fixed terminal that connects and is sandwiched under the battery stud of the rectifier bridge; the elimination of the soldered B+ terminal that was susceptible to corrosion and failure; and, an improved grounding connection.

11 Claims, 12 Drawing Sheets

Fig. 10   Taditel AD Design Versus OEM AD Regulator Design

Fig. 12

B-PLUS PATCH AND VOLTAGE TRANSIENT SPIKE SUPPRESSOR FOR AN AUTOMOTIVE VOLTAGE REGULATOR

CROSS-REFERENCE TO RELATED APPLICATIONS

This application claims the benefit of Provisional Patent Application Ser. No. 60/817,270 filed Jun. 29, 2006 by Justin Lybbert, and titled "Improved B-Plus Path and Voltage Transient Spike Suppressor for an Automotive Voltage Regulator".

FEDERALLY SPONSORED RESEARCH

None.

SEQUENCE LISTING OR PROGRAM

None.

FIELD OF INVENTION

This invention relates to a special Improved Automotive All Silicon Voltage Regulator (I-ASVR) for use in the automotive components re-manufacturing and original equipment alternator product. Particularly this new Improved Automotive All Silicon Voltage Regulator (I-ASVR) is related to devices and methods to improve the electrical connections, to prevent failures related to poor connections and heat variations, and to eliminate failures from transient voltage surges (spikes) that effect electronic devices such as the voltage regulator. This Improved Automotive All Silicon Voltage Regulator (I-ASVR) may be featured as an improved replacement regulator in the automotive electrical components re-manufacturing industry. It may also be featured with the original equipment as a manner to improve the quality and durability of the alternator voltage control.

BACKGROUND—FIELD OF INVENTION AND PRIOR ART

The new Improved Automotive All Silicon Voltage Regulator (I-ASVR) is basically a product that is designed to provide improvements to the mechanical configuration of the regulator to permit easy, fast and secure replacement. Other features offer more robust connections and transient suppression to the electrical charging system in vehicles.

A. Introduction of the Problems Addressed

The charging system in vehicles has always faced tough environmental and system conditions. Harsh corrosion from road water, salt, and mud; high vibration from rough roadways; and, high temperatures from under hood insulation increased electrical loads requiring higher outputs by the alternator, thus increasing the ambient temperatures the unit, including the regulator, is exposed to in operation. Further, in the automotive parts remanufacturing processes, dis-assembly and refurbishing has been difficult. Often wires needed "un-soldered" or cut free and then re-soldered. Fasteners were not reconnected and torqued and tightened properly. And, less than optimum materials for replacement were used. All these environmental and processing concerns effected the quality and durability of the regulators and ultimately resulted in shorter life and early failures to remanufactured alternators.

B. Prior Art

In recent years, some regulators have attempted to address these problems and shortfalls. Examples of prior replacement and original equipment (OE) regulators begin with U.S. Pat. No. 4,459,489 issued to Kirk, et al. (1984). This teaches a Generator load response control for regulating voltage in a system where a generator supplies the battery and electrical loads on a motor vehicle. This early system included a load response control for detecting whenever a substantial electrical load is applied to the generator tending to cause a drop in generator output voltage and when such a condition is detected field current is controlled to gradually increase field current from some value. The mechanical interface had limitations as described above for the remanufacturing and limited transient protection. Another very specific regulator was issued to Edwards, et al as U.S. Pat. No. 4,733,159 (1988). It teaches a Charge pump voltage regulator. Here the voltage regulator provides a pulse width modulated voltage regulator output to a drive circuit to provide field coil excitation for a voltage generator. This provided a charging signal for a battery. The voltage regulator output determined the on/off states of an FET power switching device coupled in series with a field coil across a maximum power source voltage potential corresponding to battery voltage. This device again offered little robustness or transient protection as taught by the new Improved Automotive All Silicon Voltage Regulator (I-ASVR)

A U.S. Pat. No. 4,470,003 issued to Mitchell (1984) teaches a Voltage regulator with temperature responsive circuitry for reducing alternator output current. Here a conventional voltage regulator is modified to reduce the power output from an associated alternator type generator by lowering the field current duty cycle when the ambient temperature at the voltage regulator exceeds a predetermined critical value, to thereby prevent damage to the alternator and regulator components until the ambient temperature is reduced. A temperature responsive means is connected across the field winding of the alternator and provides an override control function to the regulating section of the regulator, whenever the ambient temperature is too high. The override control causes the closed field current switch to be opened and to be held opened for a period of time that is directly related to the value of the sensed ambient temperature above the critical value. While this control helps with temperature, it has no stated features to help with electrical spikes and transient conditions. Likewise, the mechanical improvements of the improved Lybbert device are not shown or described. Other examples of rack or storage devices include a U.S. Pat. No. 4,636,706 issued to Bowman, et al. (1995) which teaches a Generator voltage regulating system. Here the improvement is a voltage regulator for regulating the output voltage of a diode-rectified alternating current generator that supplies the electrical loads on a motor vehicle including the storage battery. The voltage regulator has an up-down counter which is incremented when the output voltage of the generator is below a desired regulated value and is decremented when the output voltage of the generator is above the desired regulating value. The system is capable of sensing either battery voltage or rectifier output voltage and is controlled to automatically switch between battery voltage and rectifier voltage under certain operating conditions. The device does not feature the transient protection or mechanical enhancements shown in the new Improved Automotive All Silicon Voltage Regulator (I-ASVR) device.

Method for improved battery state of charge was shown in U.S. Pat. No. 7,064,525 issued to Pachciarz, et al. (2006). This shows a method for improving vehicle battery state-ofcharge (SOC) for initial vehicle customer delivery. The method is focused on vehicle assembly plant practices and ensuring that battery discharge is minimized or eliminated during the vehicle assembly process. The method includes determining the available maximum percentage of duty cycle voltage output from the vehicle alternator and determining a minimum idle boost speed necessary to provide minimum discharge or positive charge to the battery when the vehicle's accessories are in the "on" state during vehicle assembly. The method further includes programming the vehicle's controllers to force the maximum percentage of duty cycle voltage output available and the minimum idle speed necessary to provide minimum battery discharge or positive charge during the earliest part of the vehicle life. This does not teach the Lybbert improvements.

As far as known, there are no other Automotive Voltage Regulator devices at the present time which fully provide these improvements to the voltage regulator as the present Improved Automotive All Silicon Voltage Regulator (I-ASVR). It is believed that this device is made with improved configuration of physical connections, of a durable design, and with better electrical surge protection as compared to other currently utilized voltage regulators.

SUMMARY OF THE INVENTION

An Improved Automotive All Silicon Voltage Regulator (I-ASVR) has been developed for use with an automotive alternator in the automotive electrical component re-manufacturing industry. The device may also be used for an improved original equipment (OE) voltage regulator. It is important to note that many variations of automotive alternators may use this device with minor physical changes for mounting.

In the vehicle during operation the alternator is exposed to severe vibration, heat and corrosive materials such as road salt. During operation there may be intermittent loads such as windshield wiper motors, window actuator motors and the like that may cause transient surges. Also, in the re-manufacturing operation, the voltage regulator may be exposed to high transient voltage surges (spikes) during disassembly, reassembly and testing. Likewise during the rebuild process, a robust connection design (for proper electrical connections, including the grounding connections) will help to afford and assure a high quality and durable replacement alternator. Specifically, the Improved Automotive All Silicon Voltage Regulator (I-ASVR) device provides an economical, efficient and durable way to improve the performance and durability of a voltage regulator.

The preferred embodiment of the Improved Automotive All Silicon Voltage Regulator (I-ASVR) device is comprised essentially of four significant changes to a standard voltage regulator: The first improved change is an addition to the electronics of a transient suppression means for the loads. The second change is a connection for the B Plus (B+ battery connection) through a fixed terminal that connects and is sandwiched under the battery stud of the rectifier bridge. The third improved change is the elimination of the B+ terminal which was soldered to the terminal from the rectifier bridge to connect to the positive diode heat sink. This old configuration was susceptible to corrosion and failure. The fourth improved change is the improved grounding connections. Plastic is eliminated in the stack-up of the connection and provides metal to metal compressed connection. The removal of the plastic eliminates the "creep" from heat cycling that allows the metal and plastic to expand and contract at different thermal expansion rates which eventually may result in a failed connection.

The newly invented Improved Automotive All Silicon Voltage Regulator (I-ASVR) device is configured to aid in fast re-build in the re-assembly process. In operation, the new device may be easily and quickly affixed to the rectifier bridge and mounted to the slip ring end casting with simple tools.

OBJECTS AND ADVANTAGES

There are several objects and advantages of the Improved Automotive All Silicon Voltage Regulator (I-ASVR) device. There are currently no known voltage regulator devices that are effective at providing the objects of this invention.

The following TABLE A summarizes various advantages and objects of the Improved Automotive All Silicon Voltage Regulator (I-ASVR) device. This list is exemplary and not limiting to the many advantages offered by this new device.

TABLE A

| Various Advantages and Objects | |
|---|---|
| Item | Description of Advantage and Object |
| 1 | Disassembly of the regulator bridge simplified. One does not have to unsolder both connections but just cut the bottom connector off and then unsolder the top connection. |
| 2 | Elimination of the Bridge corrosion problem associated with the OE design that affects the regulator operation. |
| 3 | Bridges that exhibit the corrosion problem can be used with the Taditel design. |
| 4 | Same robustness as the Taditel CS T-Series regulators including transient protection. |
| 5 | Manufactured with OE materials. |
| 6 | Sealed housing design more robust to harsh environments. |
| 7 | Designed to fit 6 and 8 MM studs. |

Finally, other advantages and additional features of the present Improved Automotive All Silicon Voltage Regulator (I-ASVR) device will be more apparent from the accompanying drawings and from the full description of the device. For one skilled in the art of devices and improvements for electronic voltage regulators, it is readily understood that the features shown in the examples with this mechanism are readily adapted for improvement to other types of voltage regulation devices and systems.

DESCRIPTION OF THE DRAWINGS—FIGURES

The accompanying drawings, which are incorporated in and constitute a part of this specification, illustrate a preferred and alternative embodiments for the Improved Automotive All Silicon Voltage Regulator (I-ASVR) device. The drawings together with the summary description given above and a detailed description given below serve to explain the principles of the Special Improved Automotive All Silicon Voltage Regulator (I-ASVR). It is understood, however, that the device is not limited to only the precise arrangements and instrumentalities shown.

DESCRIPTION OF THE DRAWINGS—REFERENCE NUMERALS

The following list refers to the drawings:

| Ref # | Description |
| --- | --- |
| 31 | General Improved Automotive All Silicon based Voltage Regulator (I-ASVR) |
| 31A | Reverse side of I-ASVR (opposite of heat sink) |
| 32 | General Improved Automotive Silicon based Voltage Regulator (I-ASVR) in a casting mount |
| 33 | Slip Ring End (SRE) casting |
| 34 | B+ semi ring terminal |
| 34A | Original Equipment (OE) B + terminal |
| 35 | P or Phase tracking terminal |
| 36 | F + or Rotor Field Coil Terminal |
| 36A | Rotor Field Coil |
| 37 | Ground system |
| 37A | One Ground path/terminal |
| 37B | Another ground path/terminal |
| 38 | Heat Sink |
| 39 | Harness and regulator terminal enclosure |
| 40 | connection terminals to mate with the Electrical wiring harness of the vehicle |
| 40A | S OR STARTER Terminal |
| 40B | F or field monitor terminal and/or I or Ignition Terminal |
| 40C | L or Electrical Load Terminal |
| 40D | Phase signal Harness connections |
| 41 | Electrical diagram or schematic |
| 42 | General "KEY" parameters for the Improved ASVR |
| 43 | Voltage Compensation Graph for temperature changes |
| 44 | New Rectifier replacement bridge |
| 44A | Original Equipment (OE) |
| 45 | Stator |
| 46 | Loads to system |

-continued

| Ref # | Description |
| --- | --- |
| 47 | Battery |
| 48 | Starter |
| 49 | Key Switch |
| 50 | Fault Lamp |
| 51 | Capacitor |
| 52 | Microprocessor chip |
| 53 | Circuit Board for Regulator 31 |
| 54 | Passivation material (aka "sheep snot") |
| 55 | Circuit Board Cover |
| 55A | Circuit Board Cover raised edges |
| 56 | Stator lead terminal |
| 57 | B+ stud/fastener on improved regulator 31 |
| 57A | B+ stud/fastener on Original equipment (OE) |
| 58 | B + fastener on improved regulator 31 |
| 58A | B + fastener on original equipment regulator 59, 62 |
| 59 | Original Equipment Voltage regulator |
| 60 | B + corrosion path on existing rectifier bridges |
| 61 | Passivation aka Blue Goo" |
| 62 | New OE voltage regulator |
| 63 | Design sheet to compare regulators |
| 64 | Assembly sheet to describe some of the advantages of this new voltage regulator product |
| 65 | Voltage Regulator sales circular |
| TS | Means for Transient Suppression |

DETAILED DESCRIPTION OF PREFERRED EMBODIMENT

The present mechanism is an Improved Automotive All Silicon Voltage Regulator (I-ASVR) 31 that has been developed for use in the aftermarket for rebuilding automotive alternators. The preferred embodiment of the improved device 31 is comprised of changes in electrical transient protection TS and physical improvements to the configuration and mounting means for the voltage regulator device 31. These means are described below in detail.

There is shown in FIGS. 1-12 a complete operative embodiment of the Improved Automotive All Silicon Voltage Regulator (I-ASVR) 31. In the drawings and illustrations, one notes well that the FIGS. 1-12 demonstrate the general configuration and use of this invention. The preferred embodiment of the improved device is comprised of changes in electrical transient protection and physical improvements to the configuration and mounting means for the voltage regulator device.

The preferred embodiment of the Improved Automotive All Silicon Voltage Regulator (I-ASVR) device 31 is comprised essentially of four significant changes to a standard voltage regulator: The first improved change is an addition to the electronics of a transient suppression means TS for the loads 46. The second change is a connection for the B Plus (B+ battery connection) 34 through a fixed terminal that connects and is sandwiched under the battery stud 57 or 57A of the rectifier bridge 44 or 44A. The third improved change is the elimination of the OE B+ terminal 34A which was soldered to the terminal from the rectifier bridge 44 or 44A to connect to the positive diode heat sink. This old configuration was susceptible to corrosion and failure. The fourth improved change is the improved grounding connections 37, 37A and 37B.

The accompanying drawings, which are incorporated in and constitute a part of this specification, illustrate an embodiment of the Improved Automotive All Silicon Voltage Regulator (I-ASVR) 31 that is preferred. The drawings together with the summary description given above and a detailed description given below serve to explain the principles of the Improved Automotive All Silicon Voltage Regulator (I-ASVR) device 31. It is understood, however, that the Improved Automotive All Silicon Voltage Regulator (I-ASVR) device 31 is not limited to only the precise arrangements and instrumentalities shown.

Figure 1A:
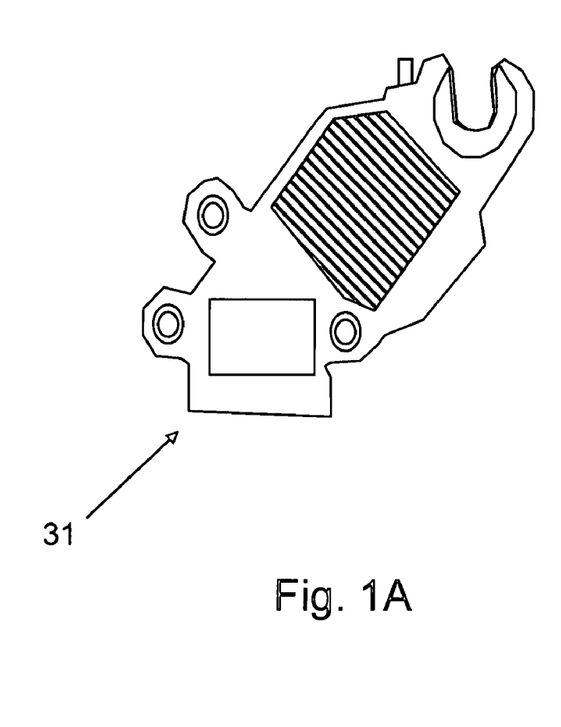
FIGS. 1A and B depict the general Improved Automotive All Silicon Voltage Regulator (I-ASVR) for remanufacturing and original equipment applications.
Figure 1B:
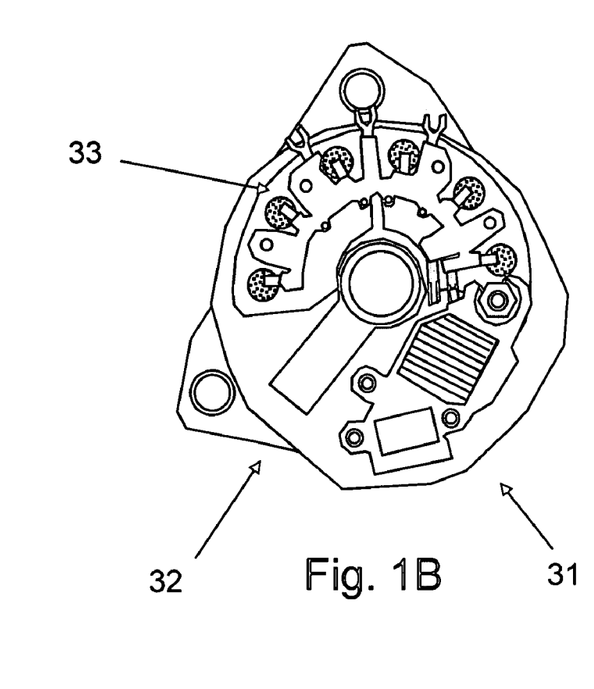

FIGS. 1A and B depict the general Improved Automotive All Silicon Voltage Regulator (I-ASVR) device 31 for remanufacturing and original equipment applications. The general device 31 is shown by itself. Then the device 31 is shown mounted to the Slip Ring End (SRE) Casting 33. In this assembly configuration, the device 31 is part of the SRE assembly 32 comprised of the device 31, a rectifier bridge, a casting, and a brush holder.

Figures 2A, 2B:
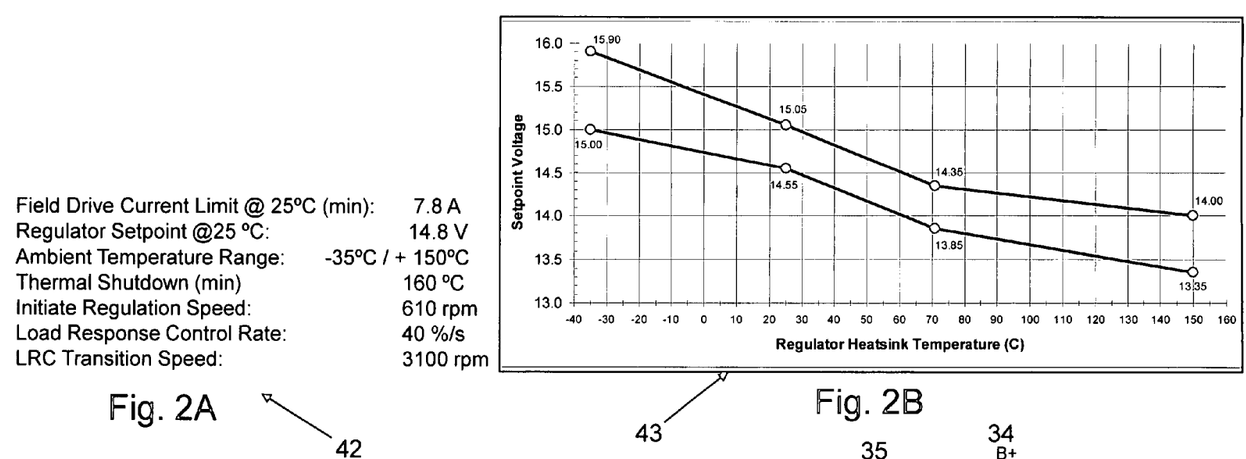
FIGS. 2A through 2D are specifications and electrical schematics for the Improved Automotive All Silicon Voltage Regulator (I-ASVR).
Figure 2C:
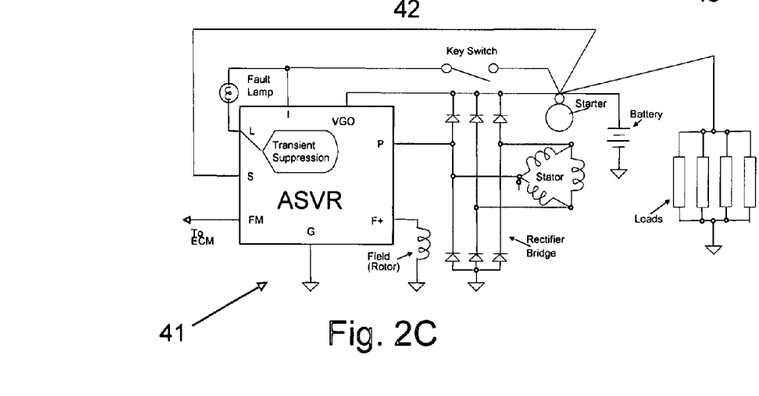

FIGS. 2A through 2D are are specifications and electrical schematics for the Improved Automotive All Silicon Voltage Regulator (I-ASVR) 31. FIG. 2A shows the general or key system parameters 42 which are listed for general reference. There is shown in FIG. 2B a graph 43 of the temperature compensation curve for the Improved Automotive All Silicon Voltage Regulator (I-ASVR) 31. In FIG. 2C the general electrical schematic 41 of how the Improved Automotive All Silicon Voltage Regulator (I-ASVR) 31 is placed in the generator system for a vehicle. This is described in detail below.

Figure 2D:
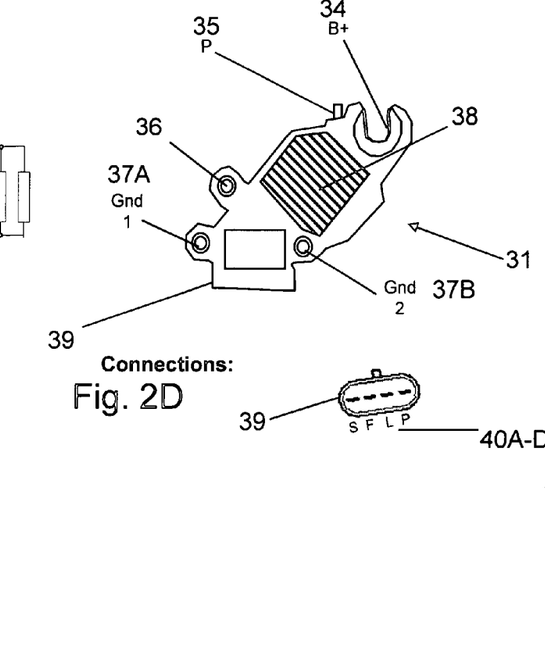

FIG. 2D then shows the Improved Automotive All Silicon Voltage Regulator (I-ASVR) 31 with many of the components identified. Here is depicted the novel B plus ring terminal 34. It is a conductive material such as a metal (copper, tinned metal, aluminum or equal) that is insert molded into the plastic body of the device 31. Note the ring terminal is an "open C". This provides a means on the B+ terminal 34 that permits easy use with fitting it in an assembly with a new or OE rectifier bridge 44 or 44A (not shown here).

Also shown is the P terminal 35, the heat sink 38, and the harness connector 39. The P terminals 35 are made of conductive metals similar to the B plus terminal 34 but configured in a shape to mate to other terminals and then be connected by a means. The material is often coated to aid in the connection means such as soldering, welding, crimping or other common fastening means. Preferred here is soldering the terminal which aid to allow disassembly and re-use if desired. The heat sink 38 is generally a metal that is an excellent heat conductor such as aluminum, copper, or the like. The preferred configuration is an extruded fin shape with much surface area to dissipate the heat. Other configurations such as the flat strap heat sink on the OE version is anticipated as well in the scope of this invention. The harness connector 39 is insert molded plastic around the harness terminals 40. Often, some mechanical means such as the small plastic protrusion shown here affords a means for the connection 39 to be securely but removable attached to the wiring harness (not shown).

Other components and features depicted in FIG. 2D include the ground terminals 37 and 37A and the Field Coil terminal 36. These are all insert molded metals that have a serration or rough surface to provide anti-turn resistance once the metal inserts are molded to the plastic. One notes the ground terminals 37 and 37A permit a metal to metal stack up when the Improved Automotive All Silicon Voltage Regulator (I-ASVR) 31 is fastened to the SRE casting 33. This feature eliminates plastic in the stack-up of materials that may suffer "creep" during the heat cycling during the alternators operation. This "creep" may result in a ground failure and cause the alternator to become inoperative.

Figure 3:
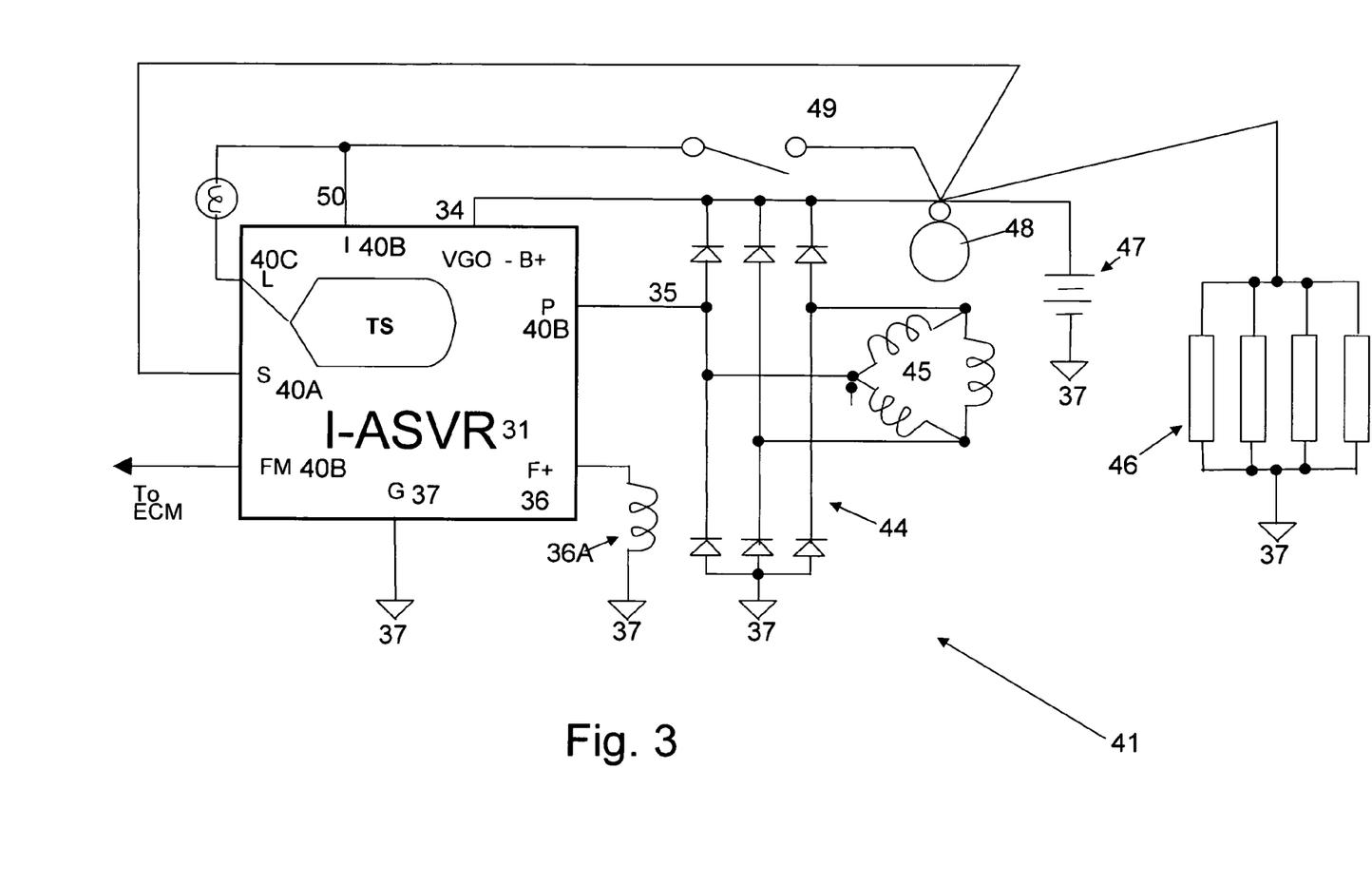
FIG. 3 is the detailed electrical schematics for the Improved Automotive All Silicon Voltage Regulator (I-ASVR).

FIG. 3 is the detailed electrical schematics for the Improved Automotive All Silicon Voltage Regulator (I-ASVR) 31. For one skilled in the art of automotive alternator systems, this is self explanatory. Significant to the system are the electrical loads 46, connection to the engine computer module (ECM) 40B and connection to the starter 48 and battery 47. The latter is normally connected through a key switch 49 commonly call the ignition switch where a person operates the switch with a key. The alternator also has a series of connections from the I-ASVR 41 to the field coil through the F+ terminal 36. The I-ASVR 31 is connected to the rectifier bridge 44 through the VGO or B Plus 34 connection described above. The rectifier bridge 44 is likewise connected to the stator 45 by lead terminals 56, shown in the drawings. A sense terminal 40A and P terminal (Phase wave) 40A also provides control information. One skilled in the art appreciates the importance of all the various ground paths 37 shown from the various components of the electrical system.

A significant improvement to the Improved Automotive All Silicon Voltage Regulator (I-ASVR) 31 is provided by the transient suppression TS. This suppression TS is added to the control chip 52 and circuit board 53 and combined in the electronic configuration. This feature of the invention anticipates all the types of suppression such as, but not limited to, diodes, capacitors, resistors, ferrites, and the plethora of other transient suppressors. The preferred means is incorporated interior to the Improved Automotive All Silicon Voltage Regulator (I-ASVR) 31 package and protected from moisture, dirt and corrosive materials. The electronic combination of the suppressor electronics TS with the circuit board 53 and control chip 52 greatly outperforms limited discrete devices that are connected by long leads and susceptible to vibration failure. Likewise the poor prevention or moisture, dirt and corrosive materials (such as road salt) hampers the effect of discrete packaged electronics.

Figures 4, 4B, 4D:
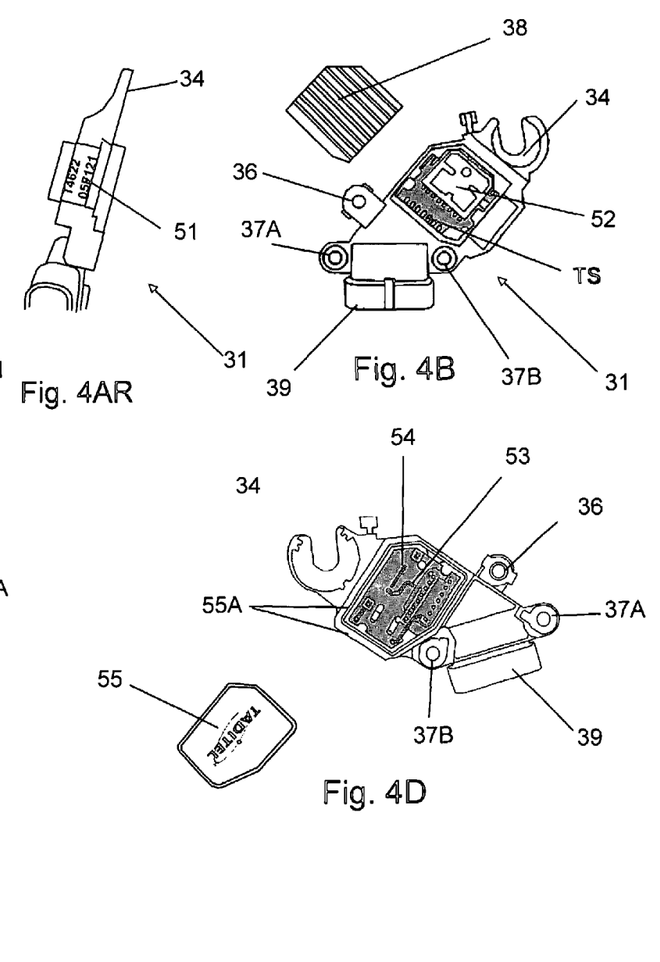
FIGS. 4A, 4B, 4C, 4D, 4AL and 4AR show additional sketches of the Improved Automotive All Silicon Voltage Regulator (I-ASVR) with the various physical attributes and configurations for the Improved Automotive All Silicon Voltage Regulator (I-ASVR).
Figures 4, 4A:
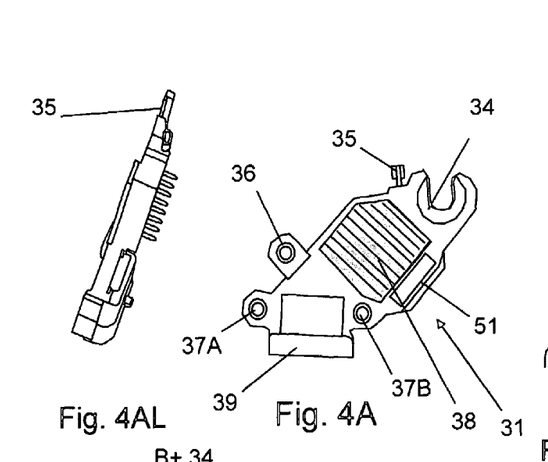
Figure 4C:
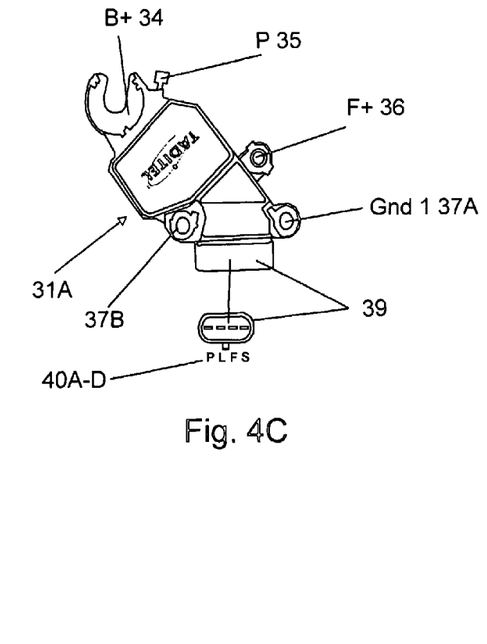

FIGS. 4A, 4B, 4C, 4D, 4AL and 4AR show additional sketches of the Improved Automotive All Silicon Voltage Regulator (I-ASVR) 31 with the various physical attributes and configurations for the Improved Automotive All Silicon Voltage Regulator (I-ASVR) 31. Many of these parts are described above and incorporated here by reference. Additional components noted include a top view of the P terminal 35 and B plus 34 as shown in FIG. 4A. Note this alleviates one terminal of the typical OE design (the B+ terminal 34A shown in FIG. 8 below). This elimination makes dis-assembly and re-assembly much simpler due to having only one terminal (P 35) to unsolder and re-solder. The B+ 34 provides the electrical connection by clamping the metal terminals securely yet removably together. In FIG. 4AR, a right side view shows the box capacitor 51 securely molded into the Improved Automotive All Silicon Voltage Regulator (I-ASVR) 31. FIGS. 4B and D show the physical position of the control chip 52, the location near the suppressor TS, and the circuit board 53. All are contained interior to the Improved Automotive All Silicon Voltage Regulator (I-ASVR) 31 case. A passivation material 54 (aka sheep snot) prevents moisture, dirt, and corrosion from reaching the electronics. Likewise a circuit board cover 55 and edges 55A are ultra sonically welded to the I-ASVR 31 frame to make the airtight connection and provide additional protection to the electronics.

FIGS. 8A through 8G are sketches that show views of the current OE (Original Equipment) type voltage regulator 59 and 62. Significant improvements are fairly obvious to one skilled in the art of automotive electronics. The heat sink 38 has no dispersion fins. The extra B+ terminal 34A hampers easy dis-assembly and re-assembly. The grounds 37A and B are susceptible to "creep" due to the plastic in the stack-up. The capacitors 51 are not molded into the assembly and are exposed. The entire termination on one of the OE regulators requires added passivation 61 (aka Blue goo). These are all limitations which have been greatly improved by the Improved Automotive All Silicon Voltage Regulator (I-ASVR) 31.

Figure 11:
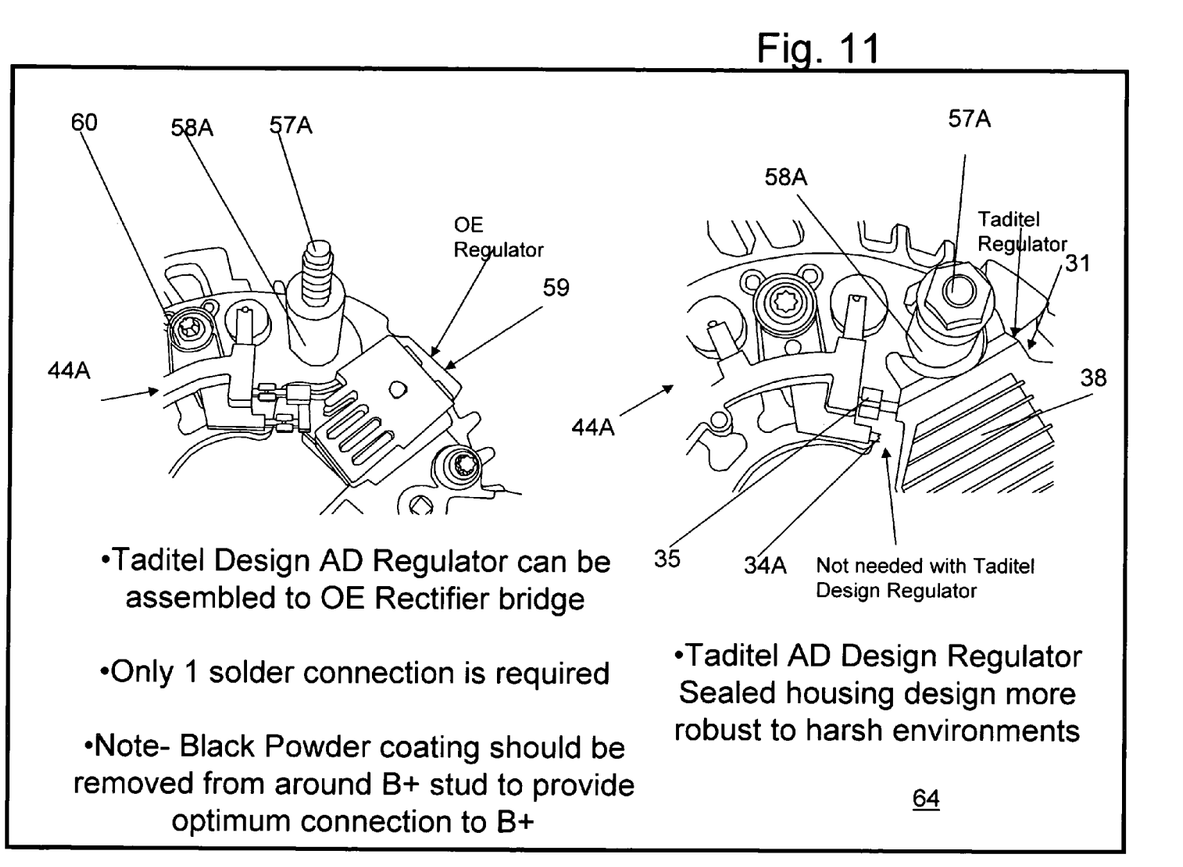
FIG. 11 are engineering and sales details for the Improved Automotive All Silicon Voltage Regulator (I-ASVR) versus the current style OE voltage regulator.

FIGS. 11 are engineering and sales details for the Improved Automotive All Silicon Voltage Regulator (I-ASVR) 31 versus the current style OE voltage regulator 59 and 62. Significant improvements are fairly obvious to one skilled in the art of automotive electronics. This detail sheet is fully incorporated into this specification by reference.

All of the details mentioned here are exemplary and not limiting. Other specific components specific to describing a Improved Automotive All Silicon Voltage Regulator (I-ASVR) 31 may be added as a person having ordinary skill in the field of electronic voltage regulators for alternators devices well appreciates.

OPERATION OF THE PREFERRED EMBODIMENT

The new Improved Automotive All Silicon Voltage Regulator (I-ASVR) 31 has been described in the above embodiment. The manner of how the device operates is described below. One skilled in the art of electronic voltage regulators for alternators devices will note that the description above and the operation described here must be taken together to fully illustrate the concept of the Improved Automotive All Silicon Voltage Regulator (I-ASVR) device 31.

The preferred embodiment of the Improved Automotive All Silicon Voltage Regulator (I-ASVR) device 31 is comprised essentially of four significant changes to a standard voltage regulator: The first improved change is an addition to the electronics of a transient suppression means TS for the loads 46. The second change is a connection for the B Plus (B+ battery connection) 34 through a fixed terminal that connects and is sandwiched under the battery stud 57 or 57A of the rectifier bridge 44 or 44A. The third improved change is the elimination of the OE B+ terminal 34A which was soldered to the terminal from the rectifier bridge 44 or 44A to connect to the positive diode heat sink. This old configuration was susceptible to corrosion and failure. The fourth improved change is the improved grounding connections 37, 37A and 37B.

Figure 5A:
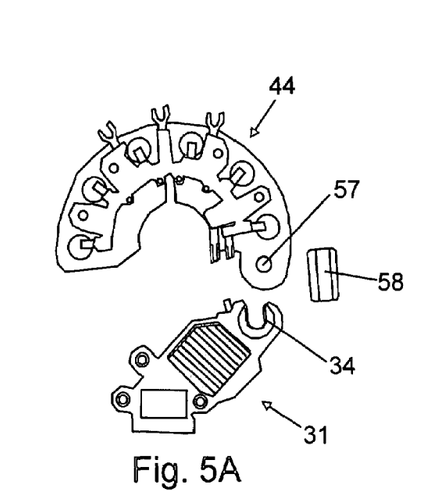
FIGS. 5A through 5F show Top View sketches of the Improved Automotive All Silicon Voltage Regulator (I-ASVR) in a progressive sequence of connecting the I-ASVR to a new type of replacement rectifier bridge.
Figure 5B:
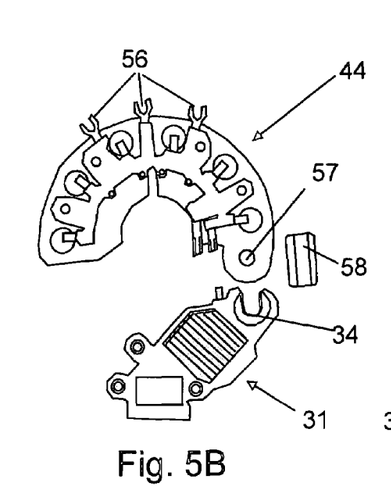
Figure 5C:
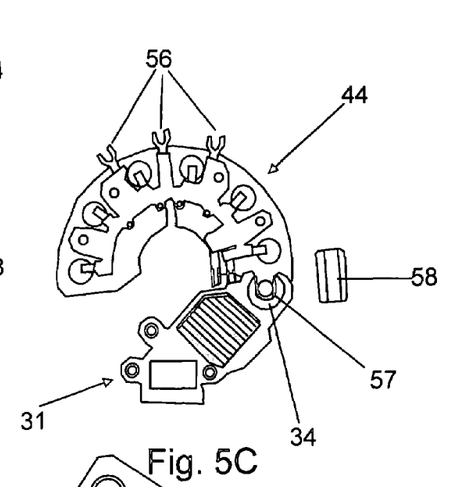
Figure 5D:
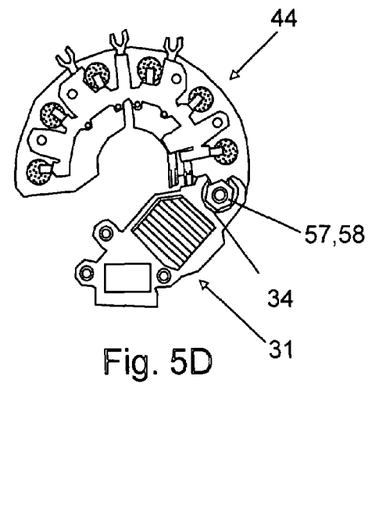
Figures 5E, 5F:
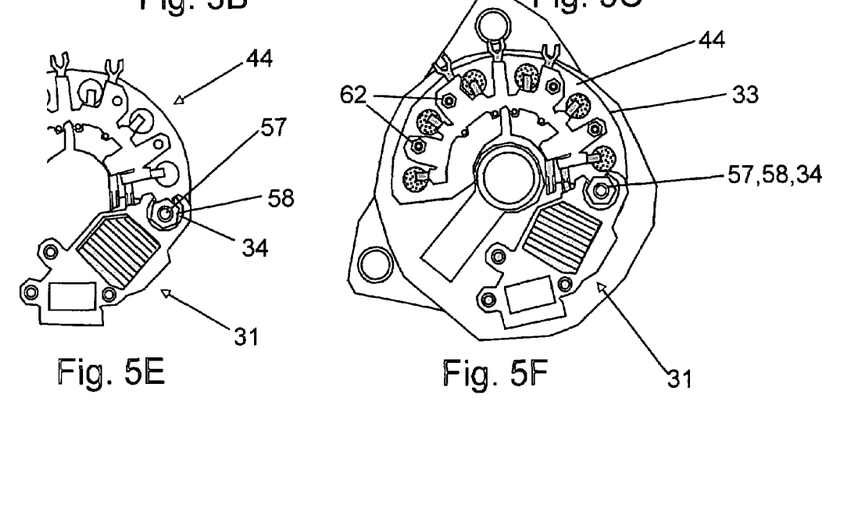

FIGS. 5A through 5F show Top View sketches of the Improved Automotive All Silicon Voltage Regulator (I-ASVR) 31 in a progressive sequence of connecting the I-ASVR 31 to a new type of replacement rectifier bridge 44. FIGS. 5A through C show the Improved Automotive All Silicon Voltage Regulator (I-ASVR) 31 positioned and moving toward the rectifier bridge 44. The P terminal 35 mated into the rectifier bridge 44 and is ready to connect (by soldering or other means). The Open "C" B+ 34 encircles and is placed contiguous to the B+ stud 57. The threaded adapter nut and spacer 58 is ready to assemble. FIGS. 5D and E show the fastener 58 being placed onto the bridge stud 57. Finally, in FIG. 5F the Improved Automotive All Silicon Voltage Regulator (I-ASVR) 31 and rectifier 44 are shown assembled to the SRE casting 33.

Figure 6A:
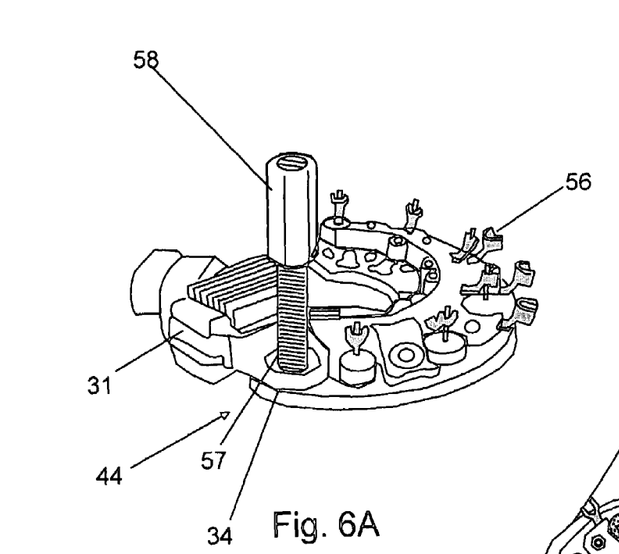
FIGS. 6A through 6C are Side View sketches of the Improved Automotive All Silicon Voltage Regulator (I-ASVR) in a progressive sequence of connecting the I-ASVR to a new type of replacement rectifier bridge.
Figure 6B:
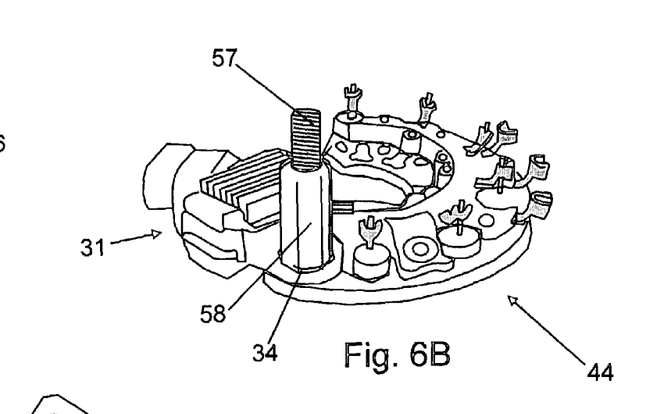
Figure 6C:
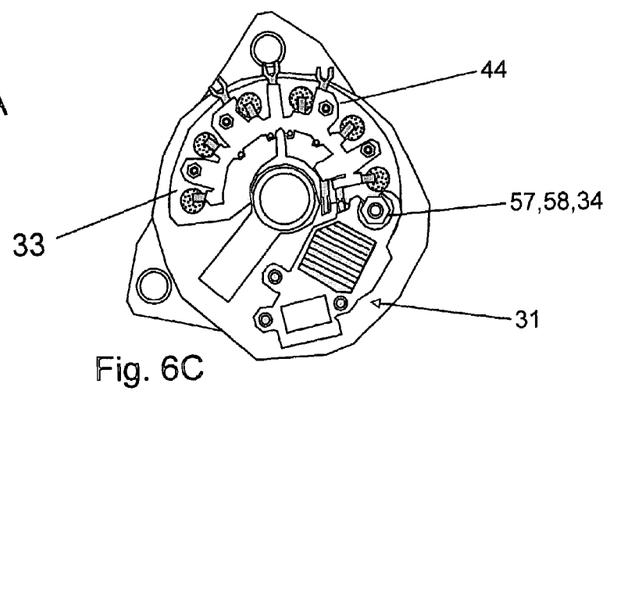
Figure 7A:
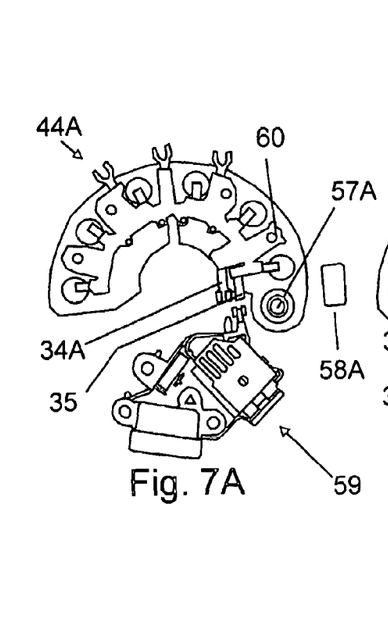
FIGS. 7A through 7D are sketches that show Top View sketches of the current standard Original Equipment Regulator in a progressive sequence of connecting the OE regulator to a standard OE rectifier bridge.
Figure 7B:
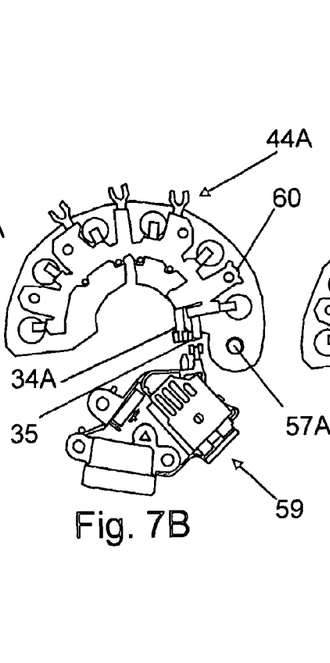
Figures 7C, 7D:
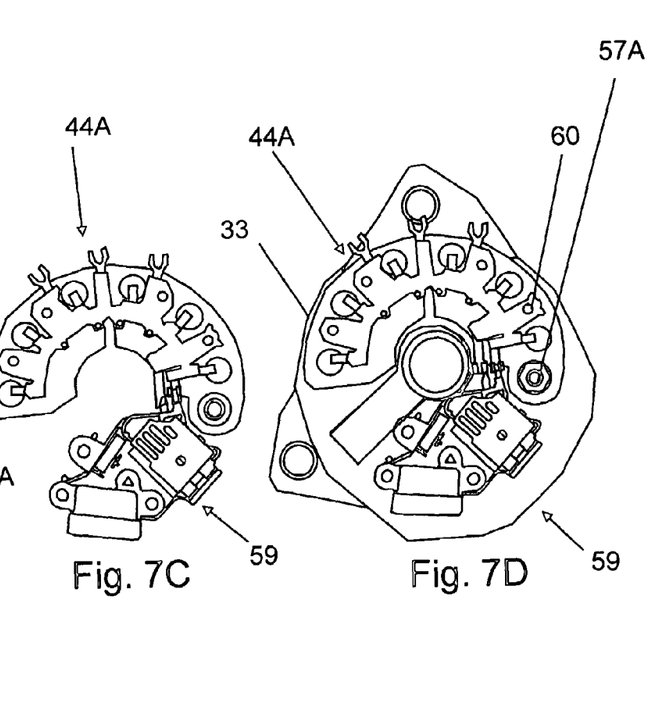
Figures 8A, 8B, 8C, 8D, 8E, 8F, 8G:
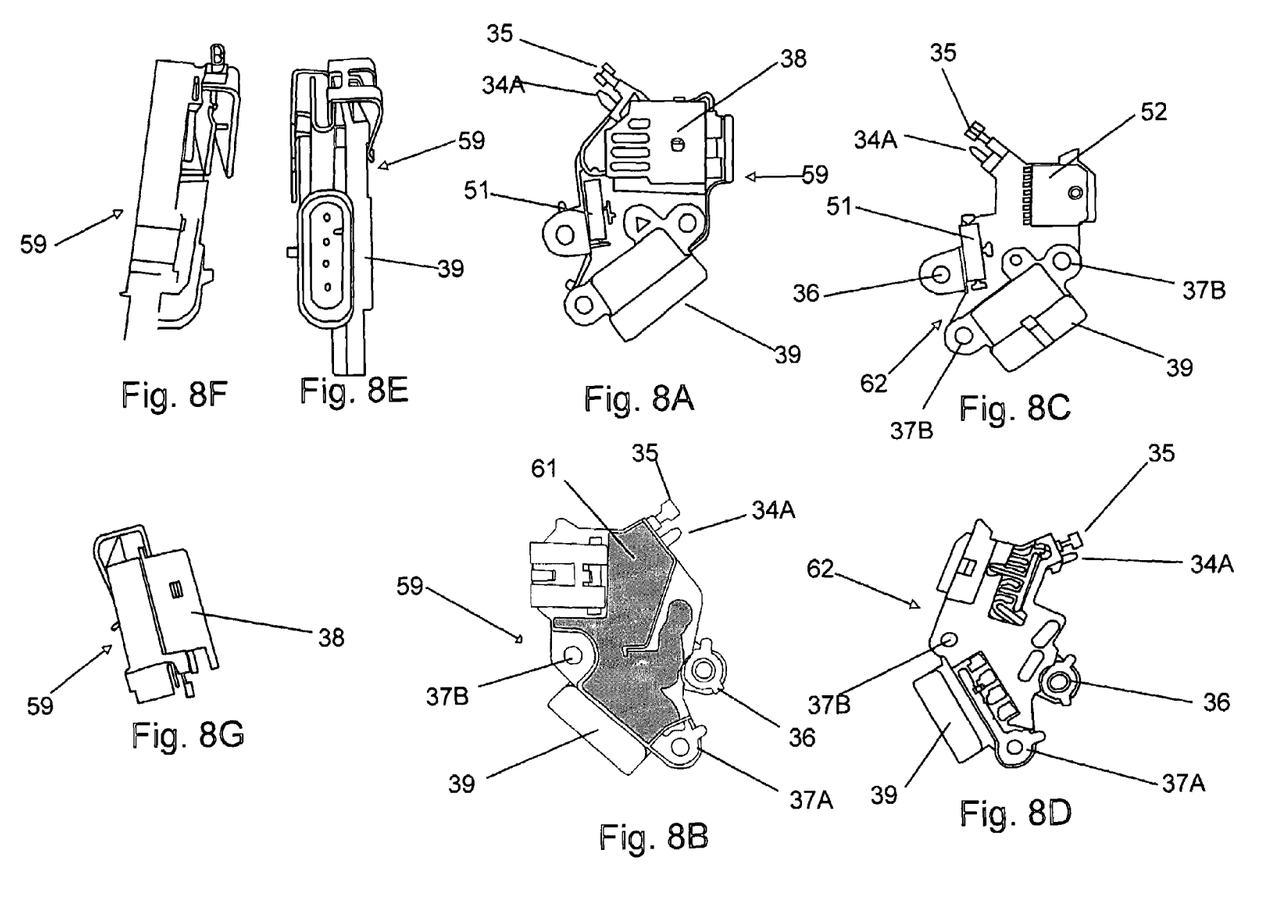
FIGS. 8A through 8G are sketches that show views of the current OE (Original Equipment) type voltage regulator.
Figures 9A, 9B, 9C, 9D, 9E, 9F, 9G, 9H:
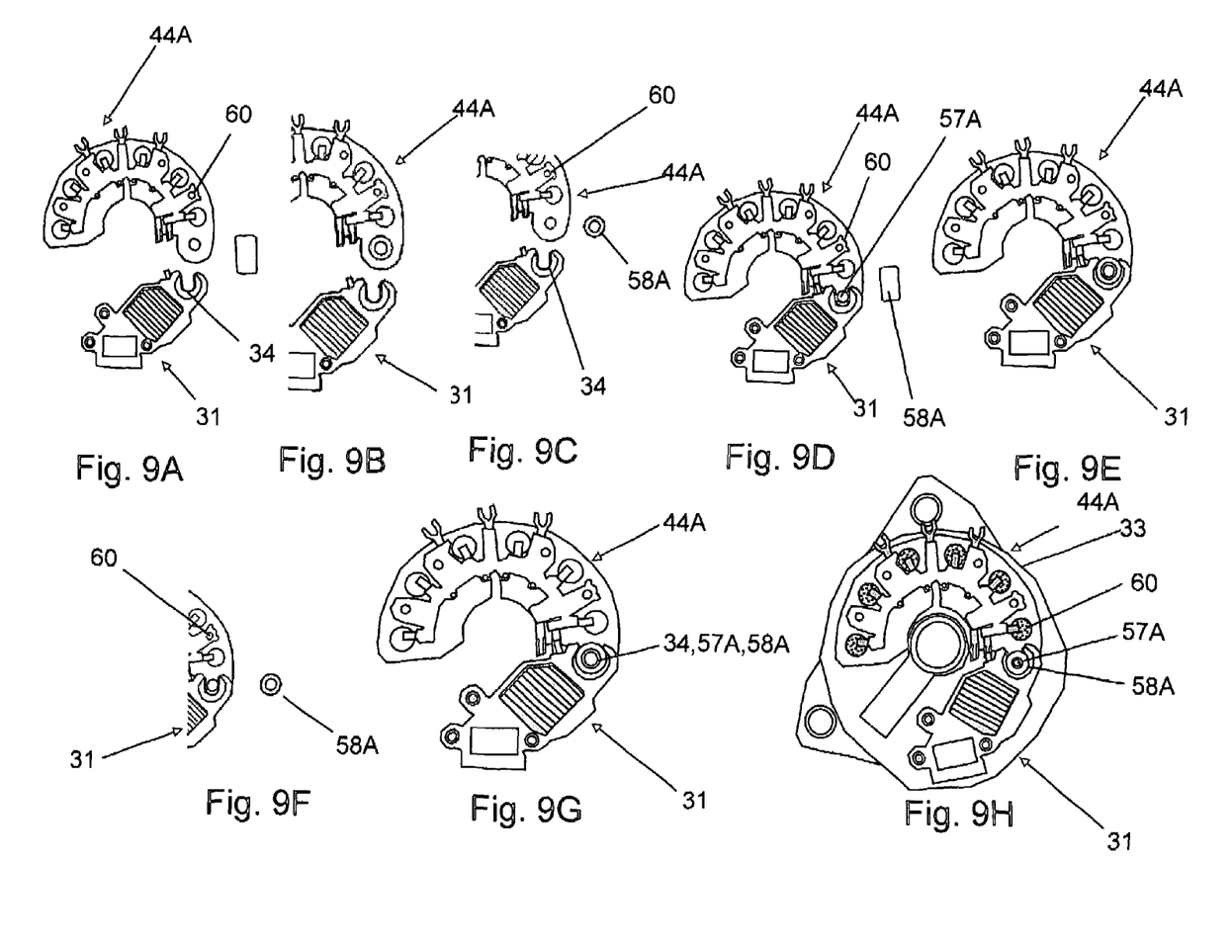
FIGS. 9A through 9H are sketches that show Top Views of the Improved Automotive All Silicon Voltage Regulator (I-ASVR) in a progressive sequence of connecting the I-ASVR to a current type OE (original equipment) type of rectifier bridge assembly.

FIGS. 6A through 6C are Side View sketches of the Improved Automotive All Silicon Voltage Regulator device the Improved Automotive All Silicon Voltage Regulator device 31 (I-ASVR) in a progressive sequence of connecting the I-ASVR 31 to a new type of replacement rectifier bridge 44. These views have the same components described in the various figures, above and are incorporated by reference. In FIG. 6B, one is well to note the very secure yet removable connection afforded by the threaded stud 57 and internally threaded spacer/fastener 58. This combination traps and sandwiched the Open "C" B+ ring terminal 34 between the fastener and the rectifier bridge 44 positive heat sink.

FIGS. 7A through 7D are sketches that show Top View sketches of the current standard Original Equipment Regulator 59 in a progressive sequence of connecting the OE regulator 59 to a standard OE rectifier bridge 44A. One notes that the B+ 34A and the P 35 must each be placed and coupled. This awkward assembly is just as cumbersome during disassembly due to the close proximity of the terminals. Getting soldering devices into location often can result in damage to the bridge 44A or regulator 59 or both. One also is well to note the necessity of the non-threaded spacer (slight press fit) fastener 58A requires a separate top nut to secure the assembly. Finally, the susceptibility to corrosion at or near the B+ connection 60 to the positive heat sink. This can result in salt bridging and other failure modes for the alternator due to the weakly designed interconnection.

FIGS. 9A through 9H are sketches that show Top Views of the Improved Automotive All Silicon Voltage Regulator (I-ASVR) 31 in a progressive sequence of connecting the I-ASVR 31 to a current type OE (original equipment) type of rectifier bridge assembly 44A. The new Improved Automotive All Silicon Voltage Regulator (I-ASVR) 31 is fully compatible with the OE rectifier bridge 44A. In practice, the bridge heat sink powder coat should be "wire brushed" to have the best connection from the spacer 58A, stud 57A and nut combination. The Open "C" B+ 34 of the Improved Automotive All Silicon Voltage Regulator (I-ASVR) 31 improves assembly as well as the elimination of a connection to the B+ terminal 34A. The corrosion problem near terminal 60 no longer effects the system since the open "C" B+ terminal 34 connects direct to the positive heat sink of the rectifier bridge 44A.

Figure 10:
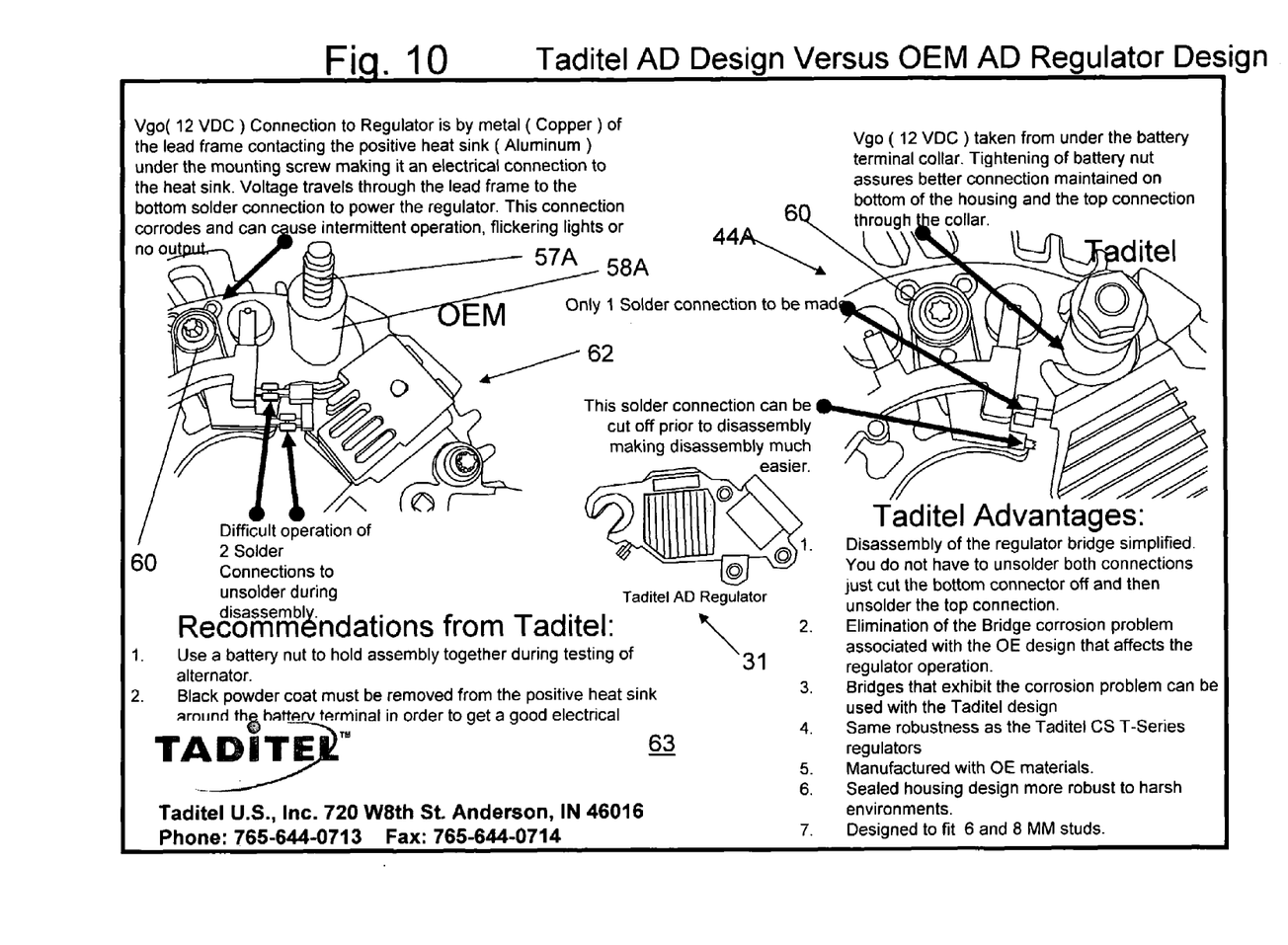
FIG. 10 are engineering and sales details for the Improved Automotive All Silicon Voltage Regulator (I-ASVR).

FIG. 10 is engineering and sales details for the Improved Automotive All Silicon Voltage Regulator (I-ASVR) 31 versus the current style OE voltage regulator 59 and 62. Significant improvements are fairly obvious to one skilled in the art of automotive electronics. The heat sink 38 has no dispersion fins. The extra B+ terminal 34A hampers easy dis-assembly and re-assembly. The grounds 37A and B are susceptible to "creep" due to the plastic in the stack-up. Additional soldering is required when assembling the OE and additional care required when removing a part during remanufacturing. These are all limitations which have been greatly improved by the Improved Automotive All Silicon Voltage Regulator (I-ASVR) 31. This detail sheet shown as FIG. 10 is fully incorporated into this specification by reference.

Figure 12:
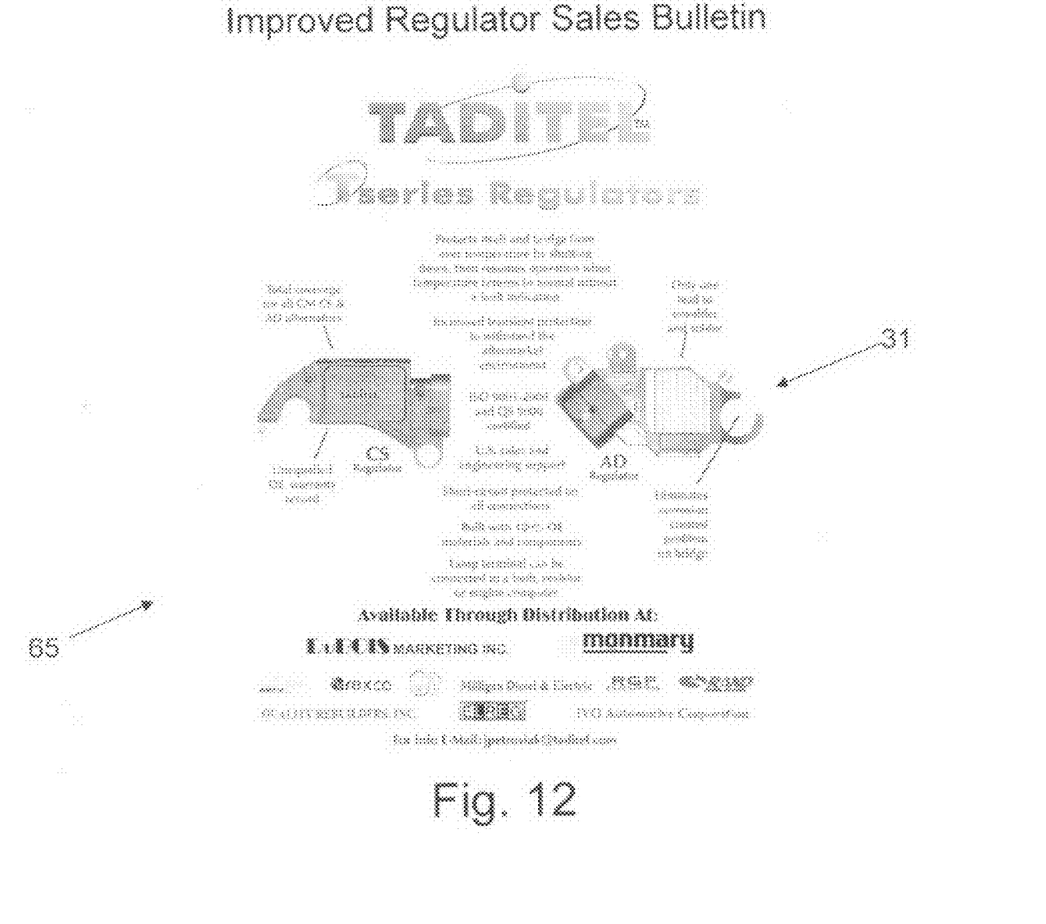
FIG. 12 is an engineering and sales bulletin for the Improved Automotive All Silicon Voltage Regulator (I-ASVR).

FIGS. 12 is an engineering and sales bulletin for the Improved Automotive All Silicon Voltage Regulator (I-ASVR) 31. The robust temperature compensation and the transient protection is noted. This detail sales sheet shown in FIG. 12 is fully incorporated into this specification by reference.

There are many potential uses for this Improved Automotive All Silicon Voltage Regulator (I-ASVR) device 31 for use as electrical voltage control. These devices may be used in virtually all alternators for all the various makes and models of vehicles. The physical configuration would need to be adapted for the specific application but the connection principles and transient protection is anticipated by this Improved Automotive All Silicon Voltage Regulator (I-ASVR) device 31. This device may be utilized with the automotive re-manufacturing and original equipment of components that generate electricity for the vehicle. Other applications for stationary power generation may use similar configurations of voltage regulators such as this device affords.

With this description it is to be understood that the Improved Automotive All Silicon Voltage Regulator (I-ASVR) device 31 is not to be limited to only the disclosed embodiment. The features of the Improved Automotive All Silicon Voltage Regulator (I-ASVR) 31 are intended to cover various modifications and equivalent arrangements included within the spirit and scope of the description.

What is claimed is:

1. An improved voltage regulator device with features for controlling the output of a mechanically driven alternator in an electrical charging system of a vehicle including:
   a). an electronic switching means connected between a battery output terminal and a connection to a rotor field winding of the alternator for closing and opening a conduction path for field current to the field winding;
   b). a means removably connected to the electronic switching means and to the battery output terminal of the alternator for regulating the DC output voltage of the alternator by controlling the switching means to close and open the conduction path when the DC output voltage changes;
   c). a means removably connected to the electronic switching means and to an electrical wiring harness with input signals from an engine control module of the vehicle;
   d). a ground means for the electrical charging system of the vehicle;
   e). a means to removably connect the electronic switching means and the electrical system ground;
   f). a means connected to the electronic switching means and to a means to transfer the heat generated in the regulator from the electronics;
   g). a means to package the voltage regulator to fit in the alternator; and
   h). a means to removably secure the package means to the alternator wherein the features comprise:
   a means for transient and surge protection, the removable battery connection means, and the removable ground protection connection means within the voltage regulator device.

2. The apparatus according to claim 1 wherein the means to package is the device placed in an insert molded plastic.

3. The apparatus according to claim 1 wherein the means to removably connect the ground is an electrically conductive metal with features wherein the metal is placed in an insert molded package.

4. The apparatus according to claim 3 wherein the features of the metal is a rough, serrated-like surface
   wherein the serration provides an anti-turn characteristic to any fasteners used with the regulator.

5. The apparatus according to claim 1 wherein the means to removably connect the battery output terminal to the regulator is a metal structure insert molded in a plastic package and the metal structure in a configured as a flat, open "C".

6. The apparatus according to claim 5 wherein the metal is tinned.

7. The apparatus according to claim 5 wherein the metal is copper.

8. The apparatus according to claim 5 wherein the metal is aluminum.

9. The apparatus according to claim 1 wherein the transient protection means is a potted capacitor.

10. The apparatus according to claim 9 wherein the capacitor is a discrete electrical component.

11. The apparatus according to claim 9 wherein the capacitor is built into the integrated circuitry of the voltage regulator.

* * * * *